US007054492B2

(12) United States Patent
Lee et al.

(10) Patent No.: US 7,054,492 B2
(45) Date of Patent: May 30, 2006

(54) FAST REGULAR SHAPED PATTERN SEARCHING

(76) Inventors: Shih-Jong J. Lee, 15418 SE. 53rd Pl., Bellevue, WA (US) 98006; Seho Oh, 5025 145th Pl. SE., Bellevue, WA (US) 98006; Donglok Kim, 25330 SE. 36th Ct., Issaquah, WA (US) 98029

( * ) Notice: Subject to any disclaimer, the term of this patent is extended or adjusted under 35 U.S.C. 154(b) by 715 days.

(21) Appl. No.: 10/255,016

(22) Filed: Sep. 24, 2002

(65) Prior Publication Data
US 2004/0057621 A1 Mar. 25, 2004

(51) Int. Cl.
*G06K 9/62* (2006.01)
(52) U.S. Cl. .................. 382/216; 382/213; 382/283
(58) Field of Classification Search .......... 382/215, 382/213, 283
See application file for complete search history.

(56) References Cited

U.S. PATENT DOCUMENTS

| | | | |
|---|---|---|---|
| 4,995,090 A * | 2/1991 | Singh et al. ............... 382/213 |
| 5,835,620 A * | 11/1998 | Kaplan et al. ............. 382/133 |
| 6,272,247 B1 | 8/2001 | Manickam et al. |
| 6,477,275 B1 * | 11/2002 | Melikian et al. ........... 382/217 |
| 6,959,112 B1 * | 10/2005 | Wagman .................... 382/181 |
| 2003/0086616 A1 * | 5/2003 | Oh et al. .................... 382/209 |
| 2004/0081360 A1 * | 4/2004 | Lee et al. ................... 382/209 |
| 2004/0101199 A1 * | 5/2004 | Lee et al. ................... 382/209 |
| 2004/0208374 A1 * | 10/2004 | Lee et al. ................... 382/209 |
| 2005/0114332 A1 * | 5/2005 | Lee et al. ................... 707/6 |

FOREIGN PATENT DOCUMENTS

JP          09-102039        4/1997

OTHER PUBLICATIONS

Hodges et al., "Faster spatial image processing using partial summation", Jan. 1996.*
Hodges et al., "Fast Multi-Resolution Image Processing for PCB Manufacture", IEE Coloquium on Multi-Resolution Modelling and Analysis in Image Processing and Computer Vision, 1995.*
Uenohara, "Use of Fourier and Karhunen-Loeve Decomposition for Fast Pattern Matching with a large set of Templates", IEEE TRansactions on Patern Analysis andMachine Intelligence, vol. 19 No. 8, Aug. 1997.*
Lee and Rhodes, "Invariant pattern recognition using angular signature functions", Applied Optics vol. 32 No. 23, Aug. 1993.*

(Continued)

*Primary Examiner*—Joseph Mancuso
*Assistant Examiner*—Jingge Wu

(57) ABSTRACT

An accumulation method for fast pattern search can accurately locate regular shaped patterns of interest. The method can be used for invariant search to match patterns of interest in images where the searched pattern varies in size or orientation or aspect ratio, when pattern appearance is degraded, and even when the pattern is partially occluded, where the searched image is large, multidimensional, or very high resolution, or where the pattern size is large. The computation requirement is independent of the size of the pattern region.

6 Claims, 11 Drawing Sheets

OTHER PUBLICATIONS

Guskov et al., "Direct Pattern Tracking on Flexible Geometry", WSCG2002, Feb. 2002.*

Silver, B, "Geometric Pattern Matching for General-Purpose Inspection in Industrial Machine Vision", Intelligent Vision '99 Conference—Jun. 28-29, 1999.

Korsheed, M et al, "Multi-font Arabic Word Recognition Using Spectral Features", Sep. 7, 2000 IEEE Proceedings ISBN:0-7695-0750, vol. 4, pp. 543-546.

Korsheed et al, "Spectral Features for Arabic Word Recognition", Jun. 9, 2000, IEEE Proceedings, ISBN: 0-7803-6293, vol. 6, pp. 3574-3577.

* cited by examiner

| Case Number | Accumulation direction 1 | Accumulation direction 2 | Pattern kernel result |
|---|---|---|---|
| 1 | ↓ | → |  |
| 2 | ↘ | ↙ |  |
| 3 | ← | ↙ |  |

FAST REGULAR SHAPED PATTERN SEARCHING

TECHNICAL FIELD

This invention relates to a method for fast regular shaped pattern searching of an image.

BACKGROUND OF THE INVENTION

Pattern search is a simple yet powerful machine vision tool. Given a template pattern and an image, its objective is to find all instances of the patterns in the image. Pattern search involves two steps, a search step and a matching step. The search step places the pattern at all valid locations of the image being searched. The matching step determines the goodness of the match between the pattern and the subset of the image centered at a given image location. A normalized correlation method (Ballard D H and Brown C M, "Computer Vision", Prentice-Hall Inc. 1982) has been widely used as the pattern matching method in many machine vision applications. The match score of normalized correlation is largely independent of linear variations in object shading caused by reflectivity or illumination variation. However, pattern search based on a normalized correlation method is inherently computationally demanding since it requires operations between two (pattern and image region) two-dimensional regions on all valid image locations. Because of the computational complexity, even with the state-of-the-art computers, it is still difficult to achieve real-time performance. This is especially true when the image size is large. Furthermore, normalized correlation does not work well when the pattern being searched is subject to rotation, size, or aspect ratio variation. The match score could drop significantly even if only a few degrees of rotation or a few percent of size change occurs.

One prior art approach to rotation and scale invariance is to rotate and scale the pattern template and try all possible scale and rotation combinations for all valid image locations. However, this imposes even greater computational demand that cannot be reasonably accomplished using the prior art method. Another prior art approach is the use of a geometric pattern matching method such as PatMax introduced by Cognex (Silver, B, "Geometric Pattern Matching for General-Purpose Inspection in Industrial Machine Vision", Intelligent Vision '99 Conference—Jun. 28–29, 1999). This approach uses geometric information in place of pixel grid-based correlation. For example, it interprets a square as four line segments and a football as two arcs. It extracts key geometric features within an object image (such as boundary encoding) and measures characteristics such as shape, dimensions, angle, arc segments, and shading. It then searches using spatial relationship correspondence between the key geometric features of the pattern template and finds the matches in the new image. This prior art approach requires high edge contrast and low noise between patterns and background to reliably extract the key geometric features. It fails when edges of a pattern are not well defined. This is the inherent problem when using geometric approach in place of pixel grid based approach.

In many application scenarios, the template pattern is a well-defined regular shape such as the shapes used in alignment or registration marks or fiducials for electronic assembly of printed circuit boards or semiconductor manufacturing. Some examples of typical alignment marks for electronic assembly includes circles, rings, cross, bar, triangles, wedges, or multiple squares. Other examples of regular shaped patterns are alphanumeric characters such as the ones used for identification of semiconductor wafers (SEMI M13-0998$^E$ "Specification For Alpha Numeric Marking of Silicon Wafers"). This invention seeks to provide a very fast pattern search method that can accurately locate regular shaped patterns of interest in a fraction of the time used by the prior art approach. It therefore forms the basis for invariant search that matches patterns of interest in instances where they vary in size or orientation, when their appearance is degraded, and even when they are partially hidden from view. It retains the advantages of the pixel grid based approach on low contrast and noisy images yet it achieves real-time performance and the advantage of rotation, or scale, or aspect ratio invariance.

The invention provides significant speed advantage in both search and matching steps.

OBJECTS AND ADVANTAGES

An object of this invention is to rapidly perform regular-shaped pattern matching and search with flexible pattern kernels. Example two-dimensional kernels are used as alignment, registration or identification marks for a variety of applications such as semiconductor wafers, IC chips, and PC board alignments and for character recognition and target tracking. The computation requirement of this invention is independent of the size of the pattern and the computational requirement for different scale and aspect ratios is identical. This fast and predictable performance is a great advantage.

It is an object of this invention to facilitate fast rotation invariant search. The accumulation transformation only needs to be performed once for each rotation angle, this represent significant advantage compared to the prior art approach that searches rotation of each of the separate regions of the image.

A still further object of the invention is to enable search for multiple template patterns simultaneously since only one accumulation transformation could support the construction of many different regular patterns.

An additional object of the invention is to allow direct specification of the template patterns and no explicit pattern learning is required. This significantly improves usability.

An object of the invention is to extend regular pattern search to include complex shapes, gray scale, color, motion tracking, and multidimensional large size or high resolution images and patterns.

A further objective of this invention is to allow the software implementation of the fast search method in a general purpose computer platform without any special hardware to reduce cost and system complexity.

SUMMARY OF THE INVENTION

An accumulation transformation method for fast pattern search begins with an input image and a pattern template specification. Using the pattern template specification, at least one accumulation transformation is performed on the received image. A pattern kernel construction process creates at least one pattern kernel result image. A match selection step is applied to the pattern kernel result image to create a match result output.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

FIG. 3 shows some example double accumulation transformations and their pattern kernel result by;

DETAILED DESCRIPTION OF THE INVENTION

Figure 1:
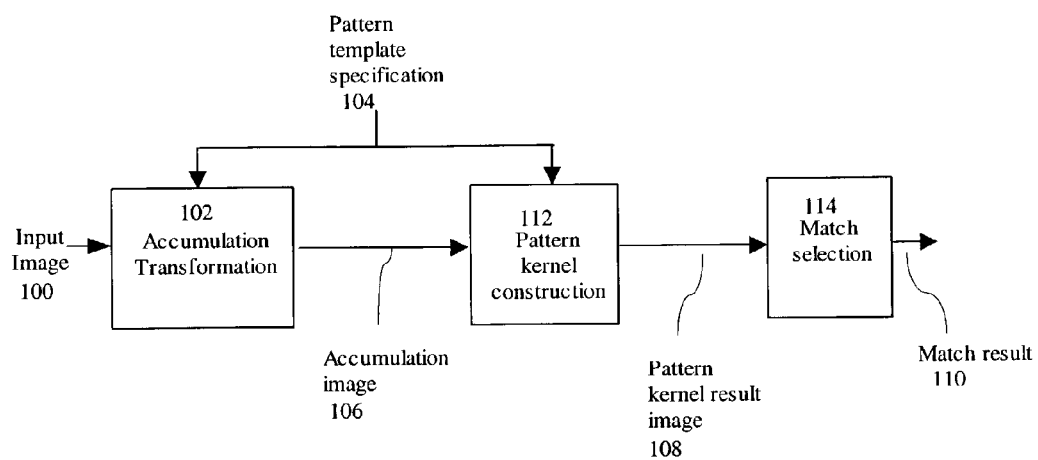
FIG. 1 shows the fast pattern search processing flow.

Pattern search is a simple yet powerful machine vision tool. Given a template pattern and an image, the pattern search objective is to find all instances of the patterns in the image. It involves two steps, a search step and a matching step. The search step places the pattern at all valid locations of the image being searched. The matching step determines the goodness of the match between the pattern and the subset of the image centered at a given image location. A normalized correlation method (Ballard D H and Brown C M, "Computer Vision", Prentice-Hall Inc. 1982, pp 68–70) has been widely used as the matching method in many machine vision applications. The match score of normalized correlation is largely independent of linear variations in object shading caused by reflectivity or illumination variation. However, pattern search based on the normalized correlation method is inherently computationally demanding since it requires operations between two (pattern and image) two-dimensional regions at all valid image locations. Even with the state-of-the-art computers, it is still difficult to achieve real-time performance when the image size is large. Furthermore, it does not work well when the pattern being searched is subject to rotation or size or aspect ratio variation. The match score could drop significantly even with only a few degrees of rotation difference between the template pattern and the patterns in the image or a few percent difference in size between the template pattern and the patterns in the image. A tiny change in aspect ratio caused for example by viewing angle of a three-dimensional object can also seriously degrade the match score result.

In many application scenarios, the template pattern is a well-defined regular shape such as the shape used in alignment or registration marks or fiducials for assembly of printed circuit boards or for semiconductor manufacturing. Some examples of the typical alignment marks for electronic assembly include circle, ring, cross, bar, triangles, wedge, or multiple squares. Other examples of regular shaped patterns are alphanumeric characters such as the ones used for identification of semiconductor wafers (SEMI M13-0998 "Specification For Alpha Numeric Marking of Silicon Wafers"). This invention provides a very fast pattern search method that can accurately locate regular shaped patterns of interest in a fraction of the time of the prior art approach. It therefore forms the basis for invariant search that matches patterns of interest in instances where they vary in size or orientation or aspect ratio, when their appearance is degraded, and even when they are partially occluded, where the searched image is large, multidimensional, or very high resolution, or where the pattern size is large. This regular pattern search method is also effective for a multidimensional pattern and image and can include color or motion search. It retains the advantage of the pixel grid based approach on low contrast and noisy images yet it achieves real-time performance and the advantage of rotation and scale invariance.

There is a significant speed advantage in both the search step and the matching step. In the search step, instead of having to access all pixels involved in the matching for each search location, accumulation images are pre-computed once per image. Little overhead is required to derive location specific information within the image for matching.

This invention performs pattern matching with flexible kernels to construct regular-shaped patterns. The two-dimensional kernels can simulate alignment or registration marks or alphanumeric characters for a variety of applications such as semiconductor wafers, IC chips, PC board alignments, wafer identification, and optical character recognition. This approach can be easily generalized to three-dimensional or higher dimensional pattern matching where even greater speed advantage could be achieved. For example, the pattern search could include different color objects or motion tracking (even including multiple distinct patterns). Therefore, it can be used in applications such as 3D medical imaging, confocal microscopy, live cell assays in drug discovery, games, E-appliance, target tracking, character recognition, or ultrasound imaging. This approach has speed advantage in both matching and search steps. The computation requirement of this invention is independent of the size of the pattern and the computational requirement for different scale and aspect ratios of a pattern is identical. This predictable performance represents a great advantage. This invention facilitates fast rotation invariant searchThis invention is especially efficient when multiple template patterns are searched simultaneously since only one accumulation transformation could support the construction of many different regular patterns. In addition, this invention allows direct specification of the template patterns and no explicit pattern learning is required. This significantly improves usability. A further objective of this invention is to allow the software implementation of the fast search method in a general computer platform without any special hardware to reduce cost and system complicity.

I. Application Scenarios

Figure 2:
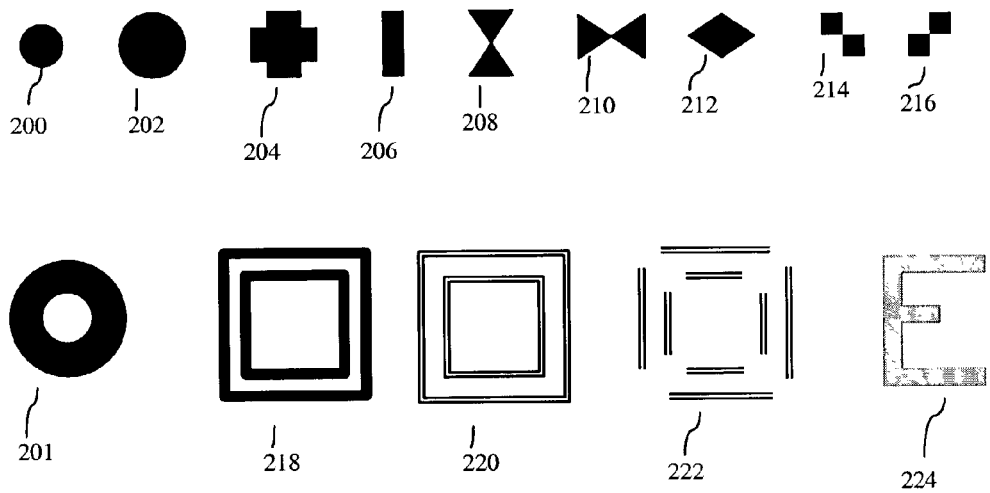
FIG. 2 shows alignment, registration mark, and character examples.

The application scenario of this invention is shown in FIG. 1 where the patterns for search are well-defined regular shaped patterns such as those found in FIG. 2.

In this application scenario, the pattern is a well defined and regular shaped such as the shapes used for alignment or registration marks or fiducials or alphanumeric characters for assembly of printed circuit boards or for semiconductor manufacturing. Some examples of the typical alignment marks for electronic assembly include circle 200, 202, ring 201, cross 204, bar 206, triangles 208, 210, wedge 212, or multiple squares 218, 220, 222. Typical registration marks include rectangular marks such as box 218 or collection of bars and frames 220, 222, 224 is an alphanumeric character.

This invention allows regular shape matching to be accomplished by appropriate use of an accumulation transformation in combination with pattern kernel construction. It does not require explicit storage of the templates or learning of the pattern. This is especially efficient when multiple template patterns are searched simultaneously since only one accumulation transformation could support the construction and search for many different regular patterns. This could achieve greater saving than the search of each pattern independently since the overhead of the accumulation transformation is nearly fixed. As shown in FIG. 1, the input image 100 is subject to an accumulation transformation 102 that generates at least one accumulation image 106 in a manner for searching for the patterns from the pattern template specification 104. The accumulation image 106 is used by the pattern kernel construction step 112 which operates according to the pattern template specification input 104 for constructing at least one pattern kernel result image 108 having kernels that are identical to the regular shape patterns specified in the pattern template specification 104. The match selection step 114 selects the image locations having good matches using the pattern kernel result image 108 to produce the match result output 110. In one embodiment of the invention, the pattern kernel result image 108 is equivalent to the template matching results of the regular pattern centered at each of the different positions of the image. In this case the positions with high match score (for bright pattern) or low match score (for dark pattern) are good match positions.

The same accumulation transformation step 102 can support multiple scale and aspect ratio searches. This is achieved by constructing pattern kernel result images of different scales and aspect ratios using the same accumulation image 106. It does not require different accumulation transformation steps for different scales and aspect ratios. This is another great advantage that can be achieved by this invention. To support rotation invariance, the accumulation transformation can be performed for different rotation angles. Alternatively, the same accumulation transformation can be applied to different rotated input images within the expected range of rotation. Since accumulation transformation only needs to be performed once for each angle at only one common point of rotation center, this represents significant advantage over the prior art approach that searches rotation separately at each valid position of the input image with a different rotation center for each region.

II. Accumulation Transformation

Given an input image, the accumulation transformation 102 accumulates the image values along one or multiple directions. For two-dimensional pattern kernel construction, at least one double accumulation image is used for the construction. More double accumulation images are used if the construction of complicated two-dimensional patterns whose shapes involve many different angles is desired. To explain the concept of the invention, the generation of a simple dual accumulation image along Y and X directions is illustrated.

Let the single accumulation in Y direction be $A_Y[x][1]=I[x][1]$ for all $x$ and $A_Y[x][y]=A_y[x][y-1]+I[x][y]$.

Where $I[x][y]$ is the pixel value of the input image at position $[x][y]$ and $A_Y[x][y]$ is the pixel value of the Y direction accumulation image at position $[x][y]$. We assume that the pixel index of y starts from 1.

The double accumulation in X and Y directions are $A_{XY}[1][y]=A_Y[1][y]$ for all $y$ and $A_{XY}[x][y]=A_{XY}[x-1][y]+A_Y[x][y]$.

Where $A_{xy}[x][y]$ is the pixel value of XY double accumulation image at position $[x][y]$. We assume that the pixel index of x starts from 1.

The accumulation transformation can be easily generalized to higher dimensions. For example, a triple accumulation along X, Y, and Z directions can be constructed by $A_{XYZ}[x][y][1]=A_{XY}[x][y][1]$ for all $z$ and $A_{XYZ}[x][y][z]=A_{XYZ}[x][y][z-1]+A_{XY}[x][y][z]$.

where $A_{XYZ}[x][y][z]$ is the pixel value of XYZ triple accumulation image at position $[x][y][z]$. We assume that the pixel index of z starts from 1.

The directions of the accumulation transformation can be determined from the input pattern template specification. For example, a simple rectangular pattern requires only accumulations along Y and X directions. A diamond shaped pattern requires accumulations along two diagonal directions. [See case 2 and case 3 of FIG. 3] More complicated patterns may require the creation of accumulation transformation images along multiple angular directions in order to compute the pattern template specification result.

Those skilled in the art should recognize that accumulation images along different accumulation directions or with different coordinate structures (such as r, θ or r, θ, φ), can be similarly constructed and they will provide useful results as will become clear in the next sections.

III. Pattern Kernel Construction

The combinations of basic shape pattern construct the pattern kernel result image 108 that is used to create match result 110 for the pattern template specification 104.

III.1 Basic Shape Pattern Construction

Figure 3:
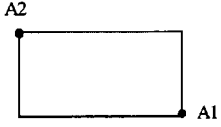
Figure 3:
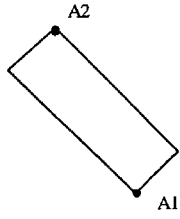
Figure 3:
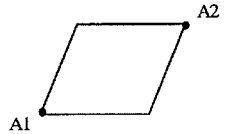
Figure 3:
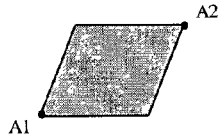

FIG. 3 shows some example double accumulation transformations and their pattern kernel result.

The accumulation image in case 1 of FIG. 3 is $A_{XY}[x][y]$ since the accumulation direction 1 is the Y direction and the accumulation direction 2 is the X direction. The pattern kernel result is the sum of the pixel values of the input image within the rectangular region bounded by the points A1 and A2 (called R(A1, A2)). This equals the cross product of the input image I and a binary pattern P[x][y] having the pixel value of 1 within the rectangular region R(A1, A2) and 0 elsewhere. That is $$= \sum_{x,y} I[x][y] * P[x][y]$$
$$= \sum_{x,y \in R(A1,A2)} I[x][y]$$

The pixel value of each point in PKR equals the cross product of the input image I and a binary pattern of the rectangular region R(Δx, Δy) at that point.

These values can be simply obtained using only simple additions and subtractions of accumulation image pixel values $A_{xy}[x][y]$. The locations of the accumulation image pixels to be used are determined by the vertexes of the basic shape. For the example in case 1 of FIG. 3 PKR[x][y]= $A_{XY}[x][y]+A_{XY}[xαx][yαy]-_{XY}[xαx][y]-A_{XY}[x][y-αy]$.

This is a significant advantage for pattern search. Note that the computation requirement is independent of the size of the rectangular region (that is Δx and Δy). This represents another advantage. The maximal pixel in the PKR image is the image location having the highest cross product with the binary pattern of the rectangular region. Therefore the pattern search can be simply accomplished by a subtraction and a maximum operation when a cross product is used as the matching criteria.

Similarly, for cases 2 and 3, the pattern kernel result is determined by simple additions and subtractions of pixel values that are in the accumulation image whose location is determined by the vertexes of the basic shape as indicated in FIG. 3. The shape of the region can be determined by the selection of the accumulation direction 1 and accumulation direction 2. Therefore, a variety of basic shapes can be constructed by the selection of accumulation angles. The inclusion of which basic shapes for an application is determined by the pattern template specification.

III.2 Pattern Construction by Combination of the Basic Shapes

Many different patterns can be constructed by a combination of basic shapes. FIG. 4 shows some examples of regular pattern construction.

Figure 4A:
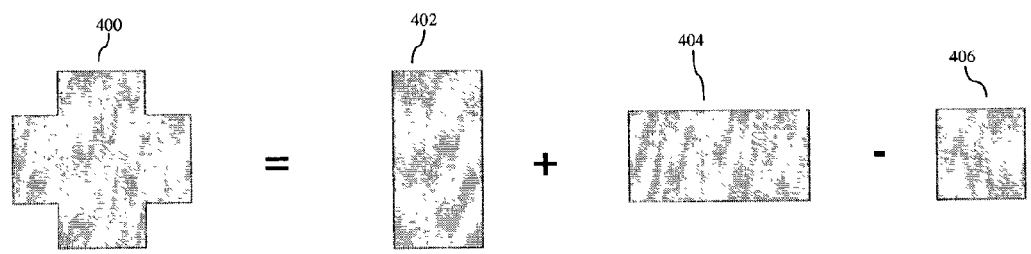
FIG. 4A shows an example pattern construction method for a cross pattern.
Figure 4B:
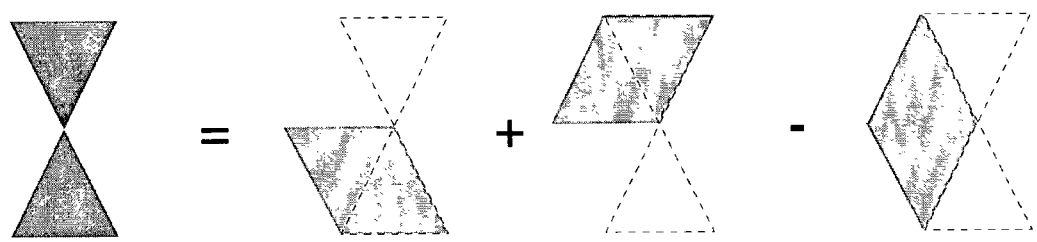
FIG. 4B shows an example pattern construction method for adjoining triangles oriented vertically.
Figure 4C:
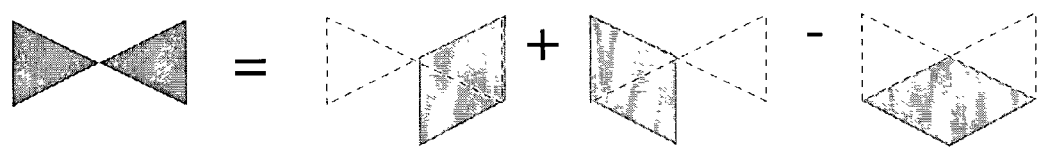
FIG. 4C shows an example pattern construction method for adjoining triangles oriented horizontally.
Figure 4D:
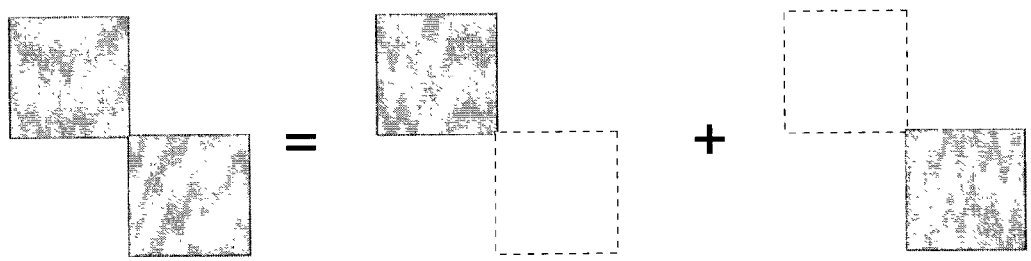
FIG. 4D shows an example pattern construction method for adjoined squares or rectangles.
Figure 4E:
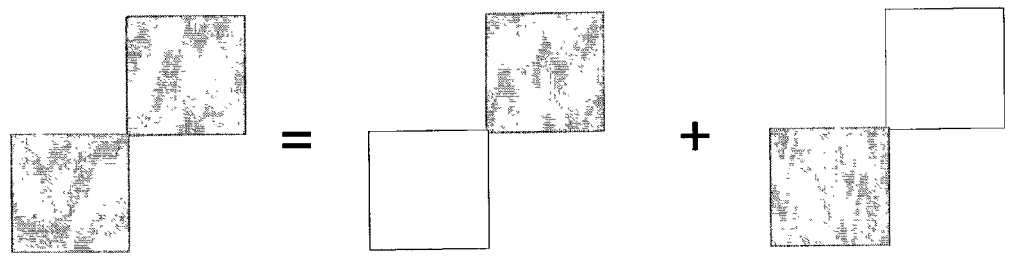
FIG. 4E shows an alternative construction for the basic adjoined squares or rectangles.
Figure 4F:
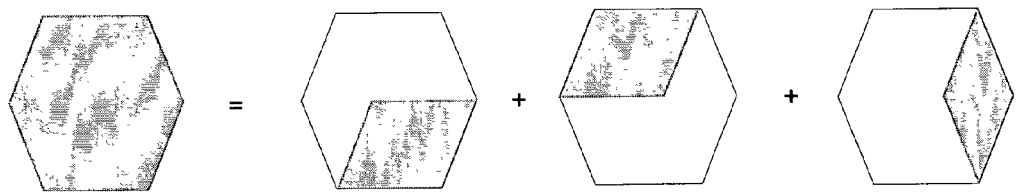
FIG. 4F shows an example hexagon construction method.
Figure 4G:
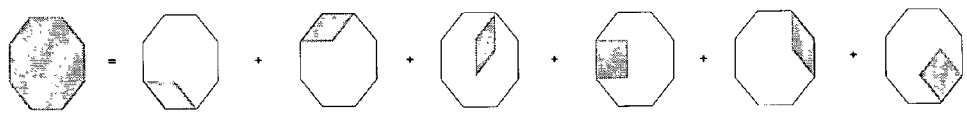
FIG. 4G shows an example octagon construction method.
Figure 4H:
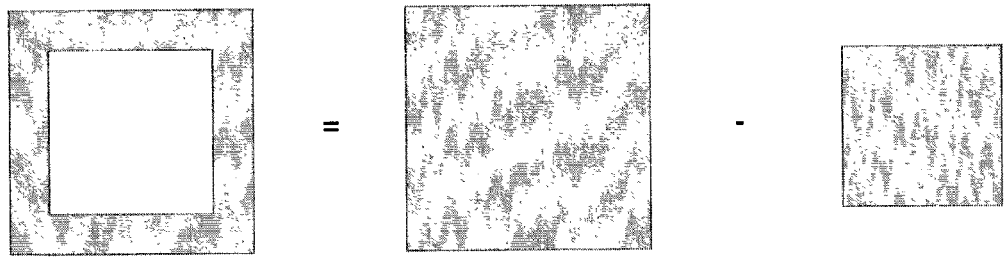
FIG. 4H shows an example pattern construction involving a combination of shapes.

As shown in FIG. 4A a cross pattern 400 can be constructed by adding two rectangular shapes 402, 404 and subtracting a square shape 406. In this case, only one accumulation image is needed since rectangles and square can all be derived from $A_{XY}$ (case 1 of FIG. 3).

Similarly, the construction of other patterns rule is shown graphically using a set of basic shapes to construct a variety of example patterns in FIGS. 4B, 4C, 4D, 4E, 4F, 4G, 4H, and 4I.

In some cases, more than one accumulation image is needed to construct the desired pattern having many angles along its boundary, such as the patterns constructed in FIGS. 4B, 4C, 4F and 4G.

III.3 Composite Positive and Negative Pattern Construction

The patterns constructed in section III.2 are positive patterns. That is, high value (or low value for dark pattern) pixels within the pattern region will increase (or decrease in the case of a dark pattern) the match result. However, they only match the pixels within regions covered by the shape of the patterns. Therefore, they will have good match results for not only pattern-like regions but also large regions with high (or low for dark pattern) values. To avoid the large region false match problem, composite positive and negative patterns are created in this invention. A composite pattern includes a positive and a negative pattern. Pixels within the positive pattern region will increase the match result and pixels within the negative pattern region will decrease the match result. In one embodiment of the invention, a region immediately surrounding the positive pattern (called surrounding rectangle) but excluding the positive pattern region is defined as the negative pattern. FIGS. 5A, 5B, 5C, 5D, 5E, 5F, 5G, 5H, 5I show a set of negative patterns (gray portion where the negative patterns are formed from the rectangular regions slightly larger than the bounding rectangle of the positive regions.

The composite positive and negative patterns can be easily constructed from the accumulation image using the positive pattern construction result and the pattern kernel result of the surrounding rectangle by the following formula:

PKR_composite=2*PKR_positive −PKR_surrounding_rectangle

Where PKR_composite designates the pattern kernel result of the composite pattern; PKR_positive designates the pattern kernel result of the positive pattern; and PKR_surrounding_rectangle designates the pattern kernel result of the surrounding rectangle. The pattern kernel result of the surrounding rectangle can be easily constructed using the method shown in FIG. 3 case 1.

FIGS. 6A, 6B, 6C, 6D, 6E, 6F, 6G, 6H, and 6I illustrate the composite kernel construction process graphically. As can be seen in FIGS. 6A–I, the composite pattern can be constructed by adding the positive pattern results twice and minus the pattern kernel result of the surrounding rectangle. Note that adding positive pattern results twice can be efficiently accomplished by up shifting the pixel values of the positive pattern results by one bit.

Since the positive-pattern-only match yields high sensitivity and the purpose of the negative pattern is to improve specificity, further speed improvement can be achieved by selective application of the composite patterns. In one embodiment of the invention, the positive-pattern-only match is applied first to identify and select good match candidates. The composite pattern match can then be applied only to the good match candidates to reject the false matches.

III.4 Character Recognition by Pattern Construction

Figure 4I:
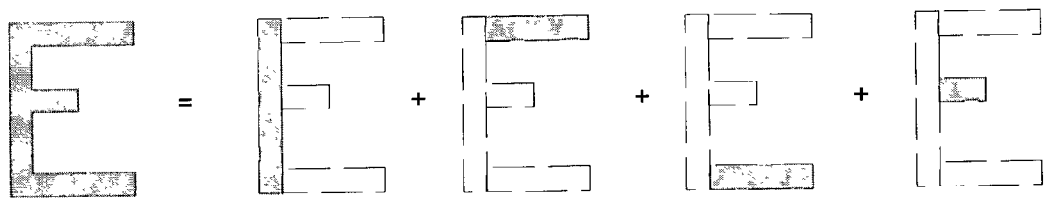
FIG. 4I shows an example pattern construction involving a character "E"

There are many applications for fast regular pattern searching. One such application is character search and recognition. For example, characters such as those defined in SEMI M13-0998 Specification for Alphanumeric Marking of Silicon Wafers are used to define the patterns for searching. An example pattern is shown in FIG. 4I where an E is defined by rectangles, and FIG. 5I where the E is shown as a composite positive and negative pattern construction, and FIG. 6I where a method for constructing the composite kernel is illustrated graphically. Other characters of the character set can be similarly synthesized.

III.5 Pattern Approximation

Figure 4J:
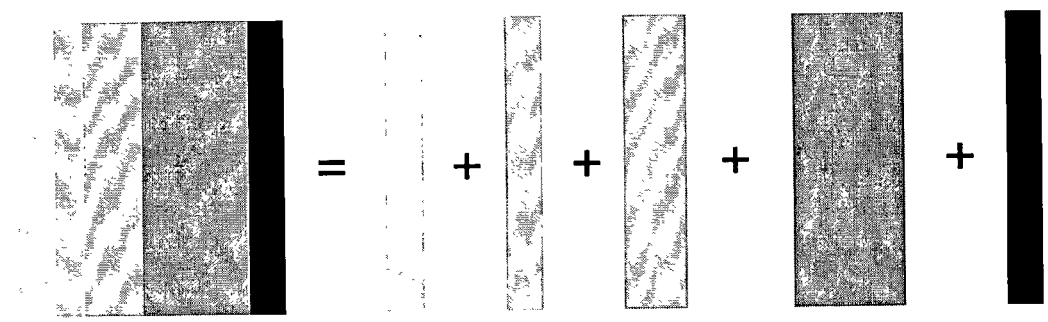
FIG. 4J shows an example pattern construction for gray scale pattern search.
Figure 5A:
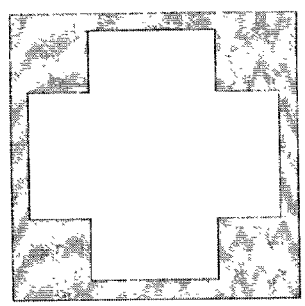
FIG. 5A shows a negative pattern of the pattern shown in FIG. 4A.
Figure 5B:
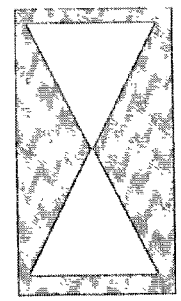
FIG. 5B shows a negative pattern of the pattern shown in FIG. 4B.
Figure 5C:
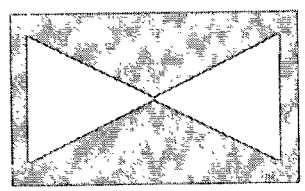
FIG. 5C shows a negative pattern of the pattern shown in FIG. 4C.
Figure 5D:
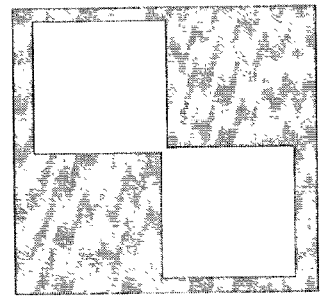
FIG. 5D shows a negative pattern of the pattern shown in FIG. 4D.
Figure 5E:
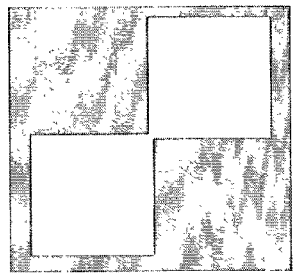
FIG. 5E shows a negative pattern of the pattern shown in FIG. 4E.
Figure 5F:
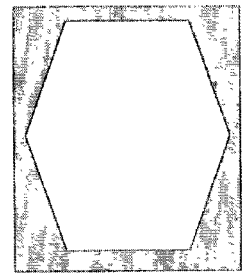
FIG. 5F shows a negative pattern of the pattern shown in FIG. 4F.
Figure 5G:
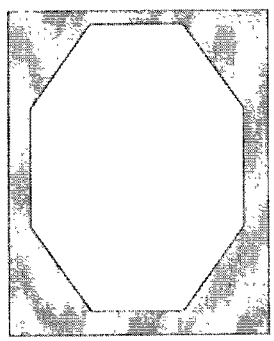
FIG. 5G shows a negative pattern of the pattern shown in FIG. 4G.
Figure 5H:
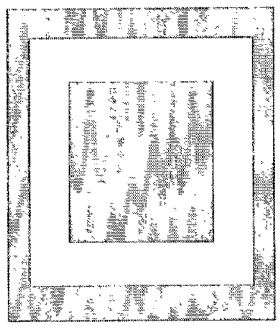
FIG. 5H shows a negative pattern of the pattern shown in FIG. 4H.
Figure 5I:
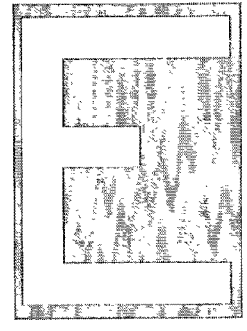
FIG. 5I shows a negative pattern of the pattern shown in FIG. 4I.
Figure 6A:
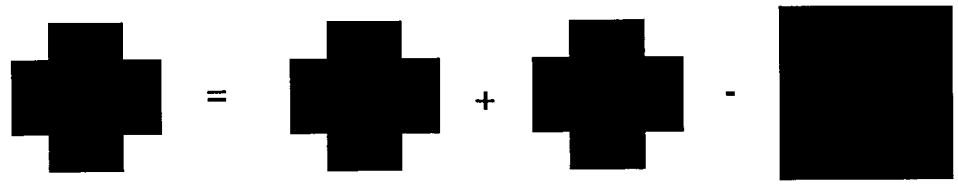
FIG. 6A shows a composite pattern construction process for a cross.
Figure 6B:
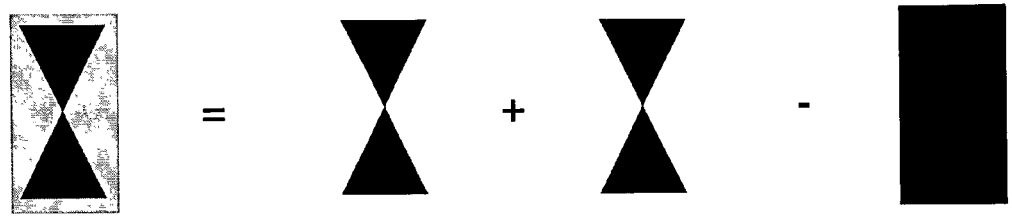
FIG. 6B shows a composite pattern construction process for a pair of adjoining triangles oriented vertically.
Figure 6C:
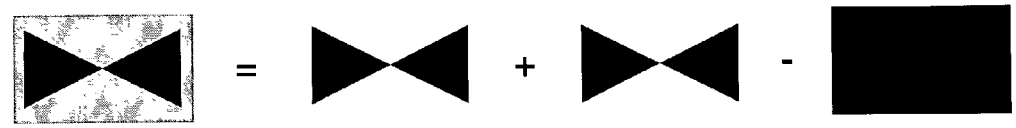
FIG. 6C shows a composite pattern construction process for a pair of adjoining triangles oriented horizontally.
Figure 6D:
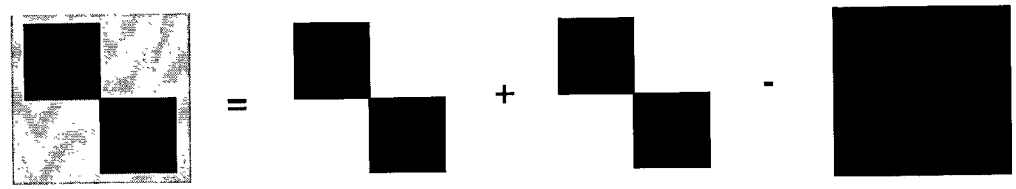
FIG. 6D shows a composite pattern construction process for a pair of adjoined squares or rectangles.
Figure 6E:
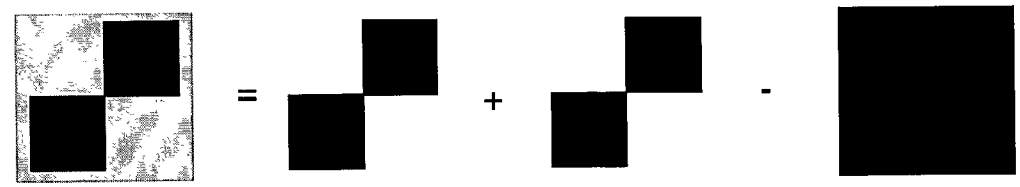
FIG. 6E shows a composite pattern construction process for an alternative to the basic adjoined squares or rectangles.
Figure 6F:
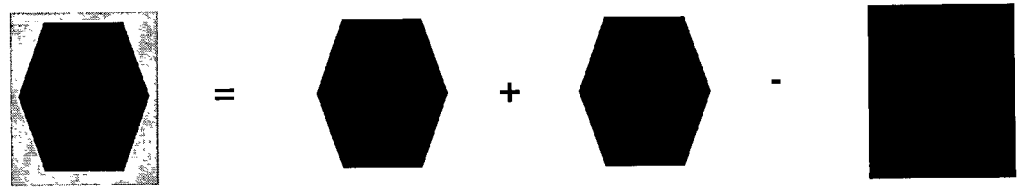
FIG. 6F shows a composite pattern construction process for a hexagon.
Figure 6G:
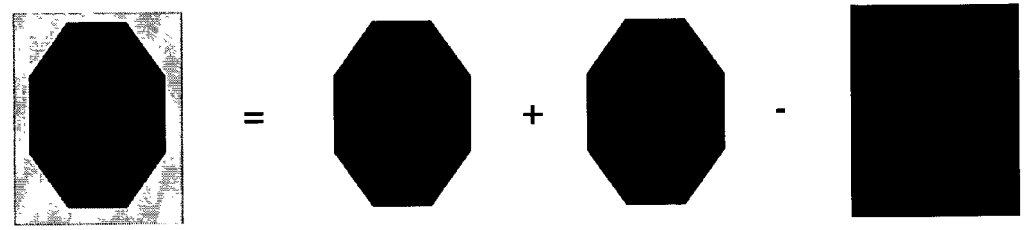
FIG. 6G shows a composite pattern construction process for an octagon.
Figure 6H:
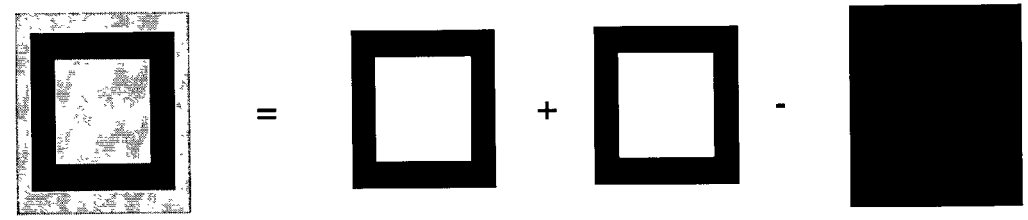
FIG. 6H shows a composite pattern construction process for a combination of shapes.
Figure 6I:
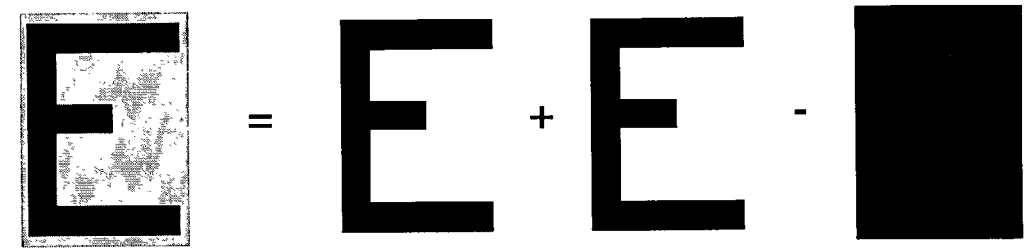
FIG. 6I shows a composite pattern construction process for a character "E"

Other patterns can be approximated for fast pattern search, producing a useful rapid search result. For example, a useful match to a circle might be an octagon in discrete digital image representation. A cylinder might be approximated by a rectangle. A gray shaded object might be approximated by a synthesis of multiple objects each having a different shade of gray juxtaposed and constructed to approximate a non-uniform gray object. In this case, the different shade of gray can be accomplished by multiplication factors, which could be implemented by bit shifts. FIG. 4J shows a gray shaded rectangle composed of 4 juxtaposed segments.

IV. Match Selection

The match selection process finds good matches or no match in the case of missing patterns using the pattern kernel result images 108. Different match functions for match selection 114 can be used such as cross correlation, normalized correlation, normalized covariance, etc. In one embodiment of the invention, the good match locations are the locations having top ranked values in the match function result image. In another embodiment of the invention, the good match locations are the locations whose values in the match function result image are greater than a threshold. In yet another embodiment of the invention, the good match locations are the locations in the match function result image whose values are greater than a threshold and are ranked among top. Those having ordinary skill in the art should recognize that other methods of match selection could be performed.

To achieve sub-pixel match accuracy, a fitting of the match function around good match locations for sub-pixel accuracy can be performed. In one embodiment of the invention, a least square polynomial fitting is conducted on the matching functions around the neighborhood of good match locations. The location of relative maxima can then be determined from the fitting parameters. Detailed implementation of fitting and relative maxima determination for one embodiment of the invention is described in Haralick, R M Shapiro L G, "Computer and Robot Vision", Vol. 1, Addison-Wesley, 1992, pp 371–380.

Those having ordinary skill in the art should recognize that other models and methods of fitting can be used for parametric representation and match function and sub-pixel best match location determination. For example, Spline functions rather than polynomials could be used.

In the following, we will discuss the implementation of different match functions using the accumulation method of the invention for match selection.

IV.1 Cross Correlation

For fast matching, simple cross correlation can be applied. The pattern kernel result of the input image represents cross correlation results of the pattern centered at all valid locations of the input image. Therefore, the match selection process is as simple as looking for pixels with high (low for dark pattern) values directly from the pattern kernel result image. The actual match location is an offset from the identified location due to the shift of the center in the pattern kernel construction. The offset value can be determined from the pattern and applied to determine the actual match locations. This method is most effective when only one template match output is involved since there is no need to perform normalization to remove a pattern specific effect.

IV.2 Cross Correlation with Area Normalization

When multiple patterns or patterns of different scale, aspect ratio, or rotation are involved, cross correlation with area normalization will yield robust results. In this case, un-normalized cross correlation is first applied for each pattern and variations of pattern. The good match locations and their cross-correlation results can then be determined for each pattern and variation of patterns. The match results for the good match locations of a pattern are then divided by the number of pixels in the pattern to create area normalized matching results. To improve the speed, the division can be accomplished by a multiplication of a pre-calculated value equal to 1 divided by the number of pixels in the pattern. The area normalized matching results of different patterns and variations of patterns are then compared to select the pattern, scale, rotation, and aspect ratio that yield top ranked area normalized matching results. The actual match location is an offset from the identified location due to the shift of the center in the pattern kernel construction. The offset value can be determined from the pattern and applied to determine the actual match locations.

IV.3 Normalized Correlation

Normalized Correlation is Defined as Follows:

$$\text{Normalized\_correlation(Input, Pattern)} = \frac{\mu(\text{Input} * \text{Pattern}) - \mu(\text{Input})\mu(\text{Pattern})}{\sigma(\text{Pattern}) * \sigma(\text{Input})}$$

Normalized correlation is not meaningful on positive only patterns since $\sigma(\text{Pattern})=0$. However, normalized correlation can be implemented for composite patterns. It is useful for fine discrimination between the matches. It is especially useful when multiple patterns or patterns of different scale, aspect ratio, or rotation are involved. The patterns are not input image dependent, so $\mu(\text{Pattern})$ and $\sigma(\text{Pattern})$ can be pre-computed using the standard mean and standard deviation formula as follows:

$$\mu(\text{Pattern}) = \frac{\sum\limits_{[i][j] \in \text{Pattern}} \text{Pattern}[i][j]}{\sum\limits_{[i][j] \in \text{Pattern}} 1}$$

$$\sigma(\text{Pattern}) = \sqrt{\frac{\sum_{[i][j] \in \text{Pattern}} [\text{Pattern}[i][j] - \mu(\text{Pattern})]^2}{\sum_{[i][j] \in \text{Pattern}} 1 + 1}}$$

For a composite pattern whose pixel count is N, the values μ(Input*Pattern) and μ(Input) can be computed by $$\mu(\text{Input} * \text{Pattern}) = \frac{\text{PKR\_composite}}{N} \text{ and}$$

$$\mu(\text{Input}) = \frac{\text{PKR\_surrounding\_rectangle}}{N}$$

To compute σ(Input), a squared image is created. The squared image is an image whose pixel values are the square values of the corresponding pixels in the input image. The accumulation transformation is applied to the squared image to create a squared accumulation image. The pattern kernel result derived from the squared accumulation image, PKR_square can be used to derive σ(input) by the following formula $$\sigma(\text{Input}) = \sqrt{\frac{\text{PKR\_square}}{N} - \mu^2(\text{input})}$$

To achieve efficient results, un-normalized cross correlation can be first applied for each pattern and variations of pattern. The good match locations can then be determined for each pattern and variations of pattern. Normalized correlation can then be applied only to the good match locations of the patterns. The normalized correlation results of different patterns and variations of patterns are then compared to select the pattern, scale, rotation, and aspect ratio that yield top ranked normalized correlation results. The actual match location is an offset from the identified location due to the shift of the center in the pattern kernel construction. The offset value can be determined from the pattern and applied to determine the actual match locations.

Those having ordinary skill in the art should recognize that other match functions such as normalized covariance could be implemented efficiently using the accumulation transformation and pattern kernel construction methods of this invention.

V. Scale and Aspect Ratio Invariant Pattern Search

Since an accumulation image fully determines the shape of the pattern, scale and aspect ratio invariant pattern search can be accomplished by constructing pattern kernel result images of different scales and aspect ratios using the same accumulation image. It does not require different accumulation transformation steps for different scales and aspect ratios. Note that the computational requirement for different scale and aspect ratios is identical. That is, large pattern search does not require any more computation than small pattern search. This is another advantage that is achieved by this invention.

Figure 7:
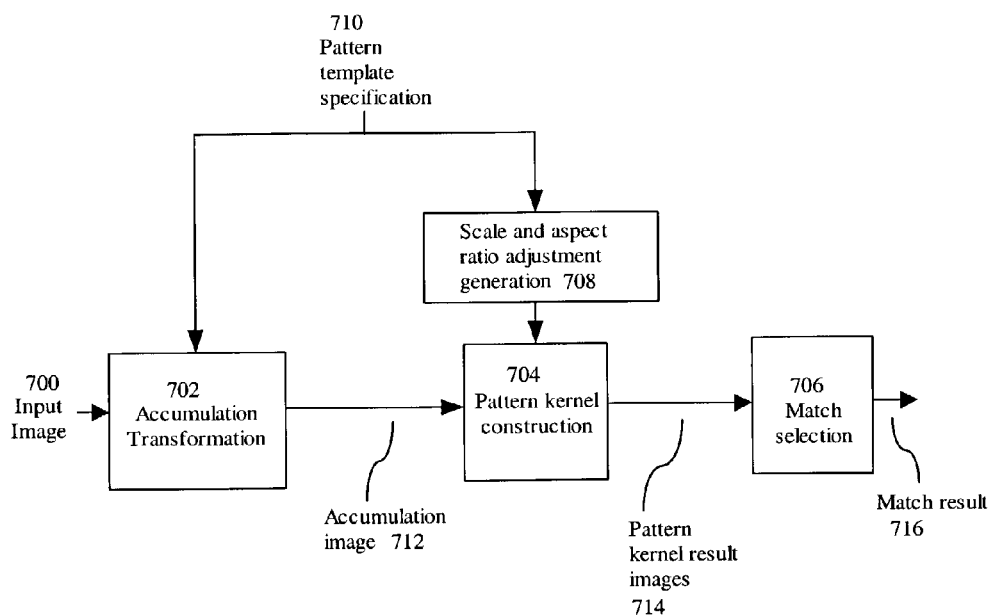
FIG. 7 shows the fast scale and aspect ratio invariant template search processing flow.

FIG. 7 shows the fast scale and aspect ratio invariant template search processing flow. A scale and aspect ratio adjustment generation step 708 inputs the pattern template specification 710 including the valid scale and aspect ratio ranges and generates a list of pattern sizes and/or aspect ratio ranges. A pattern kernel construction process 704 is applied to each of the pattern sizes and/or aspect ratio ranges. When each are applied to the accumulation image(s) 712 (accumulated 702 from the input image 700 according to the template specification 710), this results in a set of pattern kernel result images 714, each corresponding to a specific size and/or aspect ratio. These images are processed by the match selection step 706 to select the good match position, scale, or aspect ratio and determine the match score(s) as the match result output 716. The actual match location(s) is an offset from the identified location(s) due to the shift of the center in the pattern kernel construction. The offset value can be determined from the pattern and applied to determine the actual match locations.

VI. Rotation Invariant Pattern Search

To support rotation invariance, the accumulation transformation can be performed for different rotation angles. Alternatively, the same accumulation transformation can be applied to different rotated input images within the expected range of rotation. Since accumulation transformation only needs to be performed once for each angle at only one common point of rotation center, this represents significant advantage over the prior art approach that searches rotation of regions centered at all valid search locations of the image with different rotation centers for each region.

Figure 8:
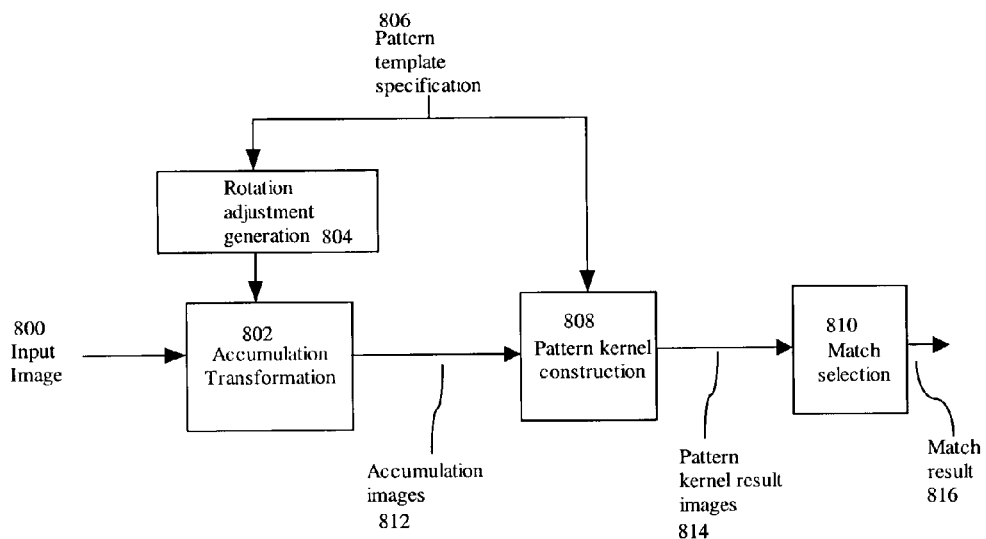
FIG. 8 shows a fast rotation invariant template search processing flow.

FIG. 8 shows the fast rotation invariant template search processing flow. A rotation adjustment generation step 804 generates a set of rotation angles. In one embodiment of the invention, the input image 800 is rotated by each rotation angle and then the accumulation transformation 802 is applied. In another embodiment of the invention, the accumulation transformation is applied to the un-rotated input image yet the accumulation directions are rotated for each rotation angle. This results in a set of accumulation images 812. The pattern kernel construction process 808 is applied to each of the accumulation images 812. This results in a set of pattern kernel result images 814. These images are processed by the match selection step 810 to select the good match position and rotation and determine the match score to generate match result 816. The actual match location is an offset from the identified location due to the shift of the center in the pattern kernel construction. The offset value can be determined from the pattern and applied to determine the actual match locations.

VII. Rotation, Scale and Aspect Ratio Invariant Pattern Search

Rotation, scale and aspect ratio invariant pattern search can be accomplished by combining the scale and aspect ratio invariant pattern search method and the rotation invariant pattern search method described in the previous sections.

Figure 9:
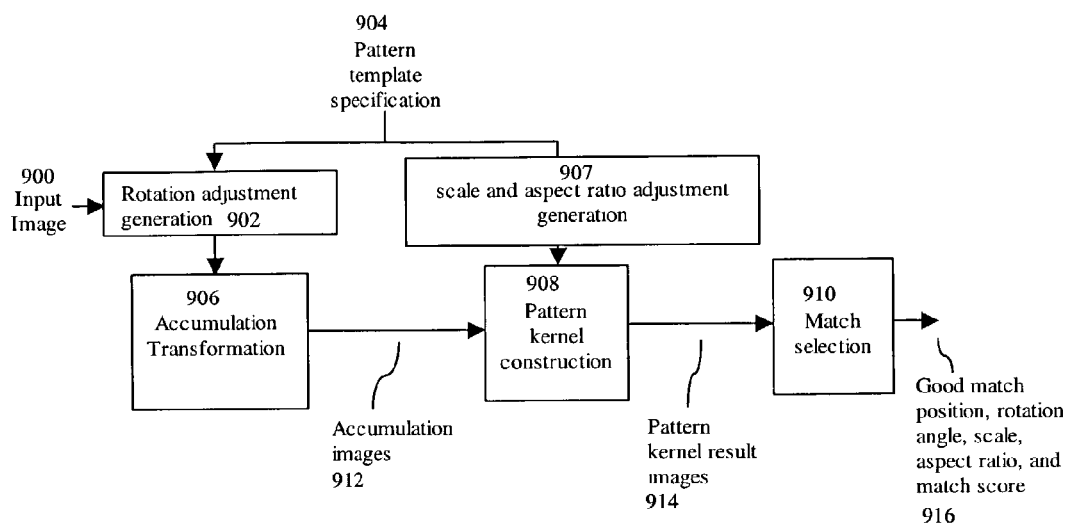
FIG. 9 shows a fast rotation, scale, and aspect ratio invariant template search processing flow.

As shown in FIG. 9, the rotation invariant pattern search method receives a pattern template specification 904 and an input image 900 and generates a set of accumulation images 912 for different rotation angles (through rotation adjustment generation 902) and constructs a pattern kernel 908. The scale and aspect ratio invariant pattern search method generates a set of pattern kernel result images 914 from the accumulation images 912 through scale and aspect ratio adjustment generation 907. The match selection step 910 searches through different angles, scales and aspect ratios to determine the good match, position, scale, aspect ratio, and rotation angle as the match result output 916. The actual match location is an offset from the identified location due to the shift of the center in the pattern kernel construction. The offset value can be determined from the pattern and applied to determine the actual match locations.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A fast pattern search method comprising the steps of:
a) Input at least one image;
b) Input a pattern template specification;
c) Using the at least one input image and the pattern template specification, perform an accumulation transformation having at least one accumulation image output;
d) Perform pattern kernel construction using the at least one accumulation image output to generate at least one pattern kernel result image;
e) Perform a rotation adjustment generation step to guide accumulation transformation having a set of accumulation image outputs;
f) Perform rotation invariant pattern search using the accumulation image outputs to create a rotation invariant pattern search result output.

2. A fast pattern search method comprising the steps of:
a) Input at least one image;
b) Input a pattern template specification;
c) Using the at least one input image and the pattern template specification, perform an accumulation transformation having at least one accumulation image output;
d) Perform pattern kernel construction using the at least one accumulation image output to generate at least one pattern kernel result image;
e) Perform a scale adjustment generation step to guide pattern kernel construction having a set of pattern kernel result image outputs;
f) Perform scale invariant pattern search using the at least one accumulation image and pattern kernel result image outputs to create an invariant pattern search result output.

3. A fast pattern search method comprising the steps of:
a) Input at least one image;
b) Input a pattern template specification;
c) Using the at least one input image and the pattern template specification, perform an accumulation transformation having at least one accumulation image output;
d) Perform pattern kernel construction using the at least one accumulation image output to generate at least one pattern kernel result image;
e) Perform an aspect ratio adjustment generation step to guide pattern kernel construction having a set of pattern kernel result image outputs;
f) Perform aspect ratio invariant pattern search using the at least one accumulation image and pattern kernel result image outputs to create an aspect ratio invariant pattern search result output.

4. A fast pattern search method comprising the steps of:
a) Input at least one image;
b) Input a pattern template specification;
c) Using the at least one input image and the pattern template specification, perform an accumulation transformation having at least one accumulation image output;
d) Perform pattern kernel construction using the at least one accumulation image output to generate at least one pattern kernel result image;
e) Perform a scale and aspect ratio adjustment generation step and a rotation adjustment generation step having a set of accumulation image outputs and a set of pattern kernel result image outputs;
f) Perform an invariant pattern search selected from the set consisting of rotation, scale, and aspect ratio using the set of accumulation image outputs and the set of pattern kernel result image outputs.

5. A fast pattern search method comprising the steps of:
a) Input at least one image;
b) Input a pattern template specification wherein the pattern template specification includes pattern approximation wherein pattern approximation includes non-uniform gray patterns;
c) Using the at least one input image and the pattern template specification, perform an accumulation transformation having at least one accumulation image output;
d) Perform pattern kernel construction using the at least one accumulation image output to generate at least one pattern kernel result image;
e) Perform a pattern search using the at least one accumulation image and the at least one pattern kernel result image to create a pattern search result output.

6. A fast pattern search method comprising the steps of:
a) Input at least one image;
b) Input a pattern template specification;
c) Using the at least one input image and the pattern template specification, perform an accumulation transformation having at least one accumulation image output;
d) Perform pattern kernel construction using the at least one accumulation image output to generate at least one pattern kernel result image wherein the pattern kernel construction step includes a composite positive and negative pattern construction
e) Perform a first positive- pattern- only search to create good match candidate outputs;
f) Further process the good match candidate outputs using a composite positive and negative pattern search to create a pattern search result output.

* * * * *